Patented Feb. 25, 1936

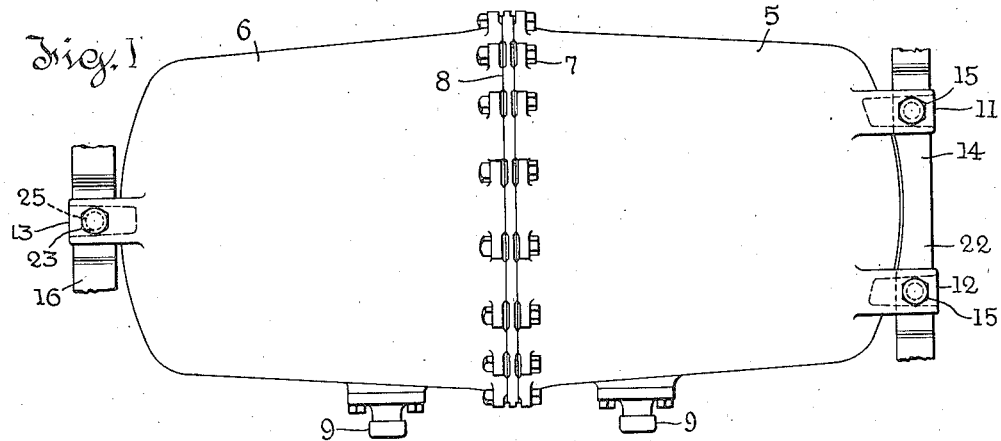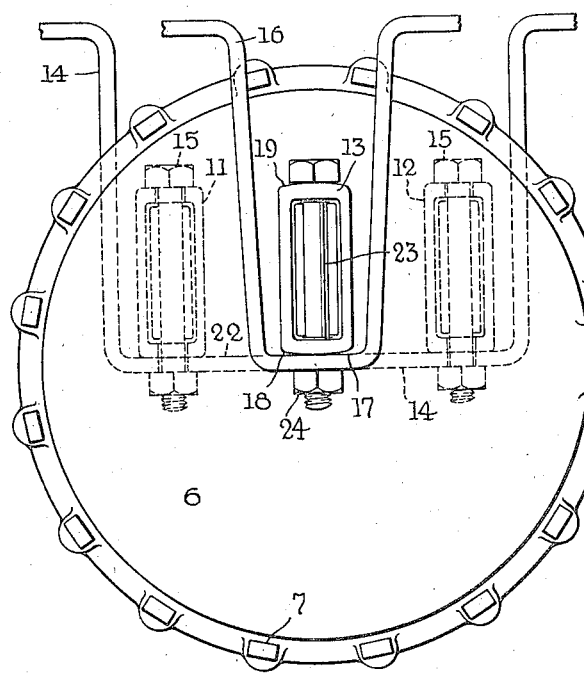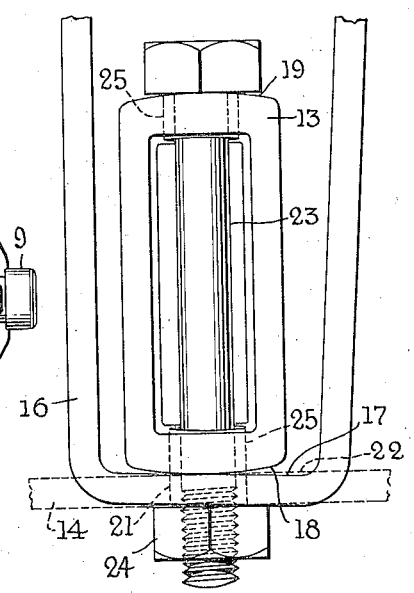

2,031,693

UNITED STATES PATENT OFFICE 2,031,693

RESERVOIR MOUNTING

James D. Cartin, Watertown, N. Y., assignor to The New York Air Brake Company, a corporation of New Jersey Application October 12, 1934, Serial No. 748,127

7 Claims. (Cl. 303—1)

This invention relates to the mounting of reservoirs for air brake systems, and more particularly to means for so mounting such reservoirs as to avoid breakage of parts during assembly.

It is usual in air brake systems to provide the cast iron air reservoirs with a three-point suspension consisting of three lugs attached to the reservoir, one at one end and two at the other. These lugs are rigidly attached to supporting brackets, usually in the form of stirrups, and carried by the floor of a car with which the reservoir is to be used. Inasmuch as the cars, and particularly the understructure, are subject to powerful distorting stresses, the alignment of the brackets is frequently disturbed, so that, when the supporting lugs of the reservoir are rigidly bolted in position, torsional stresses are applied to the lugs, this frequently resulting in one or more of the lugs, and especially the single lug being broken loose from the reservoir.

This invention is intended to avoid the above-mentioned breakage of lugs by so constructing the supporting assembly that, when the reservoir is rigidly bolted to supports which are not in accurate alignment, no breakage of parts can result. This result is obtained by so constructing the single lug that it makes substantially a single line contact with its supporting bracket and this contact may be obtained whether the brackets at the two ends of the reservoir are in alignment or not.

The preferred embodiment of the invention is shown in the drawing, in which:

Fig. 1 is a plan view of one form of reservoir mounted in accordance with this invention;

Fig. 2 is a view of the same reservoir in end elevation; and

Fig. 3 is a detail view showing the reservoir supporting means as it may be deformed in service, and illustrating how this invention avoids the difficulties of the prior art.

Referring to the drawing, reference characters 5 and 6 designate the sections of a two-part reservoir, these sections being bolted together at 7 and having the usual separating plate 8 mounted between them and sealing their inner ends from communication with each other. Conventional air connections for each of the reservoir sections are indicated at 9.

The section 5 carries two spaced hollow supporting lugs 11 and 12, forming an extended bearing surface, and here shown integral with the reservoir section in accordance with usual practice, but obviously capable of being attached thereto in other ways. These lugs are each perforated to receive bolts 15 which secure them to a supporting stirrup or bracket 14 attached to the floor of the car.

The reservoir section 6 carries a single supporting lug 13 disposed on the end of the section, and having an arcuate lower face 18 contacting with or tangent to the supporting surface 17 of bracket 16. The upper face 19 of lug 13 is also arcuate. A securing bolt 23 passing loosely through openings 25 in the lug 13 and opening 21 in bracket 16 is held in place by a nut 24.

When the reservoir is secured in position as shown in Fig. 2, the flat bottom faces of lugs 11 and 12 contact with the flat upper supporting surface 22 of stirrup 14 at two widely spaced points. Lug 13 however, contacts with the surface 17 of stirrup 16 along substantially a single line, thus completing a three-point suspension and holding the reservoir in stable equilibrium. Should the supporting surfaces of the brackets 14 and 16 be thrown or twisted out of alignment the loose fit between bolt 23 and the openings 25 and 21, as well as the curvature of faces 18 and 19 on lug 13 would permit a line contact to be made between lug 13 and surface 17 without subjecting the lug to breaking stresses.

The action just described will be better understood by reference to Fig. 3 in which the lug 13 is shown in connection with a stirrup 16 which is badly out of alignment with respect to stirrup 14, and the degree of curvature of surface 18 is emphasized for better illustration. Tangent relation is secured between arcuate surface 18 and flat surface 17, even with the surface 17 disposed at a considerable angle with respect to surface 22. The radius of curvature of the surfaces 18 and 19 may be varied in accordance with requirements to permit the action just described.

While in the embodiment of the invention illustrated the bottom face of lug 13 is made arcuate, it will be understood that the essential point is that the contact between the third lug and its support be along substantially a single line, regardless of which surface is curved and which is flat, and that provision be made for securing this line contact with the supporting surfaces of the brackets in various angular relations. The structure shown by way of example is the one now considered to be most practical but no limitations are to be implied other than those expressed in the claims.

While the invention has been illustrated as applied to a two-part reservoir, it will be obvious that its application is not limited to this particular type of reservoir, but is of general application.

What is claimed is:

1. A reservoir assembly for air brake systems comprising a pair of spaced supporting members, a reservoir; at least two spaced lugs on one end of said reservoir and rigidly connected to one of said members; and a single lug on the other end of the reservoir and secured to the other member by a substantially single line contact connection, said lug being constructed and arranged to obtain said single line contact connection in any one of a plurality of positions of said lug and its supporting member.

2. A reservoir assembly for air brake systems comprising a pair of rigid spaced supporting members; a reservoir disposed between and carried by said members; means providing an extended bearing surface between one end of said reservoir and one of said members; and means carried by the other end of said reservoir and affording a single line supporting contact between said reservoir and said other supporting member, in any one of a plurality of positions of said reservoir with respect to said other supporting member.

3. A reservoir assembly for air brake systems comprising a reservoir and two spaced supporting members therefor; a pair of spaced lugs on one end of said reservoir, said lugs being in substantially flat contact with one of said supporting members and rigidly secured to it at at least two spaced points; a single lug on the other end of said reservoir, said lug having substantially a single line contact with the other of said members; and means securing said single lug to its supporting member to obtain said single line of contact whether said supporting members are aligned or misaligned.

4. A reservoir assembly for air brake systems comprising a reservoir and two spaced supporting stirrups therefor; a pair of spaced lugs on one end of said reservoir and secured to one of said stirrups; a single lug on the other end of said reservoir, and formed to contact with the other of said stirrups along substantially a single contact line; and means for securing the single lug to its stirrup to maintain said single line contact between said lug and its stirrup when the two stirrups are misaligned.

5. A reservoir assembly for air brake systems comprising a pair of spaced supporting stirrups; a reservoir having two spaced lugs on one end thereof and secured to one of said stirrups; a third lug on the other end of said reservoir, said lug having arcuate top and bottom surfaces and a bolt-receiving opening; and a bolt passing loosely through said opening and securing said third lug to the other stirrup to afford substantially a single line contact between said arcuate bottom surface and its cooperating stirrup.

6. The combination with a plurality of spaced supporting members, of a reservoir having two lugs at one end and a single lug at the other for cooperation with said members; means for securing said two lugs to aligned surfaces on said members; and means for securing said single lug to another of said members, said last-named means being constructed and arranged to compensate for misalignment between said members, in any one of a plurality of positions of said single lug with respect to its supporting member.

7. The combination with a plurality of spaced supporting members, of a reservoir having two supporting lugs at one end secured to one of said members and a single supporting lug on the other end and secured to the other of said members, said single lug and its supporting member being in contact at substantially a single line only; and means for so securing said single lug to its member as to compensate for misalignment between the lug-contacting surfaces of said members, in any one of a plurality of positions of said lug with respect to its supporting member.

JAMES D. CARTIN.